US011826887B2

(12) United States Patent
Reimers

(10) Patent No.: US 11,826,887 B2
(45) Date of Patent: Nov. 28, 2023

(54) HOLDING CLAMP FOR HIGH FABRIC LOAD APPLICATIONS

(71) Applicant: PCCI, Inc., Alexandria, VA (US)

(72) Inventor: Stephen Reimers, Falls Church, VA (US)

(73) Assignee: PCCI, Inc., Alexandria, VA (US)

( * ) Notice: Subject to any disclaimer, the term of this patent is extended or adjusted under 35 U.S.C. 154(b) by 334 days.

(21) Appl. No.: 17/466,853

(22) Filed: Sep. 3, 2021

(65) Prior Publication Data

US 2022/0072685 A1   Mar. 10, 2022

Related U.S. Application Data

(60) Provisional application No. 63/075,057, filed on Sep. 4, 2020.

(51) Int. Cl.
*B25B 5/16* (2006.01)
*B25B 5/02* (2006.01)
*B25B 5/14* (2006.01)

(52) U.S. Cl.
CPC .............. *B25B 5/163* (2013.01); *B25B 5/02* (2013.01); *B25B 5/14* (2013.01)

(58) Field of Classification Search
None
See application file for complete search history.

(56) References Cited

U.S. PATENT DOCUMENTS

| | | | | |
|---|---|---|---|---|
| 82,666 | A * | 9/1868 | Wells | D06F 59/08 38/102 |
| 1,300,482 | A * | 4/1919 | Petranich | F16B 5/0692 248/273 |
| 2,066,049 | A * | 12/1936 | Passek | D06F 53/04 24/136 R |
| 2,526,912 | A * | 10/1950 | Swanson | B44C 7/022 160/90 |
| 5,076,033 | A * | 12/1991 | Patsy, Jr. | F16B 7/0433 52/63 |
| 10,773,578 | B1 * | 9/2020 | Poehner | F16B 45/04 |
| 2023/0249014 | A1 * | 8/2023 | Squire | F16G 11/048 24/69 WT |

* cited by examiner

*Primary Examiner* — Bryan R Muller
*Assistant Examiner* — Dana Lee Poon
(74) *Attorney, Agent, or Firm* — Fresh IP PLC; Clifford D. Hyra; Aubrey Y. Chen

(57) ABSTRACT

The present invention is generally directed towards clamps for high tension load applications. In particular, the invention relates to high holding power clamps in which fabric can be secured, and which can withstand a large amount of force, including, in at least some embodiments, the maximum amount of tension permitted in various modern high strength fabrics and/or fiber weaves. In at least one embodiment, a holding clamp has a single-V design, with at least three areas that exert pinching effects on fabric held in the clamp, and at least four capstan areas that exert capstan effects on the clamped fabric. In at least a further embodiment, a holding clamp has a double-V design, with at least six areas that exert pinching effects on fabric held in the clamp, and at least seven capstan areas that exert capstan effects on the clamped fabric.

14 Claims, 5 Drawing Sheets

HOLDING CLAMP FOR HIGH FABRIC LOAD APPLICATIONS

CROSS-REFERENCE TO RELATED APPLICATIONS

This application claims priority to U.S. Provisional Application No. 63/075,057, filed Sep. 4, 2020, which is hereby incorporated by reference in its entirety.

This invention was made with government support under contract no. WC133R-11-CN-015 awarded by NOAA and contract nos. N00024-15-C-4102 and N00024-18-C-4319 awarded by NAVSEA. The government has certain rights in the invention.

FIELD OF THE INVENTION

The application relates generally to holding clamps. In particular, the application relates to multiple novel types of holding clamps that secure fabric at high tensions without resulting in slippage of the fabric from the clamps.

BACKGROUND

Holding clamps are used in various applications and industries to secure items, including, for instance, fabric. Many modern fabrics contain high-strength fiber weaves capable of withstanding large amounts of tension. These fabrics are especially useful in the construction of structures or components that need to operate under high tension.

However, currently-available holding clamps are often unable to secure fabric at high tension, leading to a failure condition in which the clamped fabric slips out of the clamp. Such slippage can cause follow-on failures if the fabric is part of a larger structure. State-of-the-art fabric clamps generally rely on a pinching effect, which is insufficient to secure many fabrics at the maximum fabric tension available in many high-strength fiber weaves.

Given the foregoing, there exists a significant need for novel holding clamps that prevent slippage of fabric from the clamp at high tension values.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In general, the present disclosure is directed towards holding clamps, including, for instance, high holding power clamps for use with fabrics. In particular, the application relates to fabric clamps that utilize both capstan effects and pinching effects in order to restrain fabric in the clamp. The clamps disclosed herein prevent slippage of the fabric out of the clamp even when the amount of tension applied to the fabric is close to, or at, the maximum tension value of the fabric.

A capstan is a device for holding and tensioning a rope or other fiber or textile, having a curved surface around which the rope, fiber, or other textile is wound. The capstan equation relates the hold-force to the load-force if a flexible line is wound around a cylindrically curved surface. Because of the interaction of frictional forces and tension, the tension on a line wrapped around a capstan may be different on either side of the capstan. A small holding force exerted on one side can carry a much larger loading force on the other side; this is the principle by which a capstan-type device operates.

The formula is: $T_{load} = T_{hold} e^{\mu \phi}$, where $T_{load}$ is the applied tension on the line, $T_{hold}$ is the resulting force exerted at the other side of the capstan, $\mu$ is the coefficient of friction between the line and capstan materials, and $\phi$ is the total angle swept by all turns of the line, measured in radians (i.e. with one full turn the angle $\phi = 2\pi$). It can be observed that the force gain increases exponentially with the coefficient of friction, the number of turns around the cylinder, and the angle of contact. The radius of the cylinder has no influence on the force gain. The same principles generally apply for curved surfaces that are not cylindrical.

Prior clamps known in the art rely primarily on a pinching effect, and such clamps can fail due to slipping of the fabric out of the clamp at a tension lower than the maximum fabric tension available in many modern high-strength fabrics. Non-limiting examples of clamps known in the art include, for instance, the portable compression chamber described in WO 2009/106797.

In at least one embodiment of a novel high holding power clamp, the clamp comprises at least four areas that exert capstan effects (also referred to herein as "capstan effect areas") against the fabric held in the clamp (i.e., areas where the fabric is wound around a curved surface), and at least three areas that exert pinching effects (also referred to herein as "pinch effect areas") on the clamped fabric. The clamp has been determined to develop up to 5,143 pound-force (lbf) of holding power per inch of clamp length—enough to achieve 360 psig test pressure in a tested pressure vessel application.

In at least a further embodiment of a novel high holding power clamp, the clamp comprises at least seven capstan effect areas and at least six pinch effect areas. The clamp has more than 720 degrees of capstan effect (i.e., $\phi$ in the capstan effect formula above, expressed in degrees) and has holding capacity consistently well above the 5,143 lbf per inch of clamp length required to achieve 360 psig test pressure in the above-noted tested pressure vessel application and at least as high as 6,862 lbf per inch. In all tests, the fabric failed before the clamp, so the actual holding power of this embodiment is presumably greater than 6,862 lbf per inch and potentially substantially greater. As a result, the clamp has sufficient holding capacity such that that capacity is limited only by the strength of the fabric. In other words, for at least some fabrics, it is not possible to pull out the fabric from the clamp under any circumstances; that is, the fabric will tear or otherwise fail before the point at which the fabric can be pulled out from the clamp.

One of skill in the art will appreciate that the present invention discloses clamps that are capable of withstanding significantly more force than currently-existing clamps, thereby enabling safe operation of the clamps at significantly higher fabric tension.

It should therefore be further appreciated that the present invention contains benefits for many applications requiring, or containing, high fabric tensions. Non-limiting examples of such applications include structures that contain at least some fabric, including high-pressure inflatable fabric structures such as mooring systems, and lightweight structures with highly loaded high-pressure inflatable fabric structures such as pressure vessels.

A new holding clamp for fabric includes a first clamp piece, a second clamp piece having a groove with an open side facing the top clamp piece, a wedge positioned in the groove and between the first clamp piece and the second clamp piece, and a pressure source configured to press the first clamp piece and the second clamp piece towards each other. The wedge is shaped such that, when a fabric is wrapped around the wedge and the pressure source is pressing the first clamp piece and the second clamp piece towards each other, the fabric is pinched between the wedge and the first clamp piece and/or the second clamp piece and is subject to at least 360° of capstan effect. The first clamp piece may be a clamp plate, the second clamp piece may be a frame, and the pressure source may be clamp bolts that pass through the clamp plate and part of the frame.

Additionally, the groove in the aforementioned holding clamp may comprise the open side, a bottom curved portion, and two straight sidewalls. The sidewalls may not be parallel. Further, there may be a 10%, or an approximately 10% slope difference between the two straight sidewalls.

The wedge in the aforementioned holding clamp may comprise comprises a first side adjacent the first clamp piece and two other sides each adjacent to one of the two sidewalls of the groove. The sidewalls may be angled such that each pound of force exerted by the first clamp piece on the first side of the wedge generates ten pounds of force, or approximately ten pounds of force exerted by each of the two other sides of the wedge against the sidewalls.

The wedge may further be shaped such that, when a fabric is wrapped around the wedge and the pressure source is pressing the first clamp piece and the second clamp piece towards each other, the fabric is pinched between the wedge and the first clamp piece and/or the second clamp piece in at least two pinch effect areas.

In at least one embodiment, the pressure source extends at least partially through the first clamp piece and the second clamp piece in at least two different points, one of the points being on one side of the groove and another of the points being on an opposite side of the groove, thereby resisting enlargement of an angle between sidewalls of the groove under pressure from the wedge.

The wedge may also comprise a second groove, and an open side of the second groove may face in the same direction as the open side of the groove of the second clamp piece.

In at least a further embodiment, the holding clamp comprises a projection configured to sit in the second groove and configured such that, when the fabric is wrapped around the wedge and the pressure source is pressing the first clamp piece and the second clamp piece towards each other, the fabric is pinched between the projection and the second groove. Additionally, when the fabric is wrapped around the wedge and the pressure source is pressing the first clamp piece and the second clamp piece towards each other, the fabric may be subject to at least 720° of capstan effect.

The aforementioned projection may be part of a secondary wedge and, when the pressure source is pressing the first clamp piece and the second clamp piece towards each other, the secondary wedge may be clamped between the first clamp piece and the wedge.

In at least one embodiment, the second groove comprises the open side of the second groove, a bottom curved second groove portion, and two straight second groove sidewalls. These second groove sidewalls may not be parallel and may additionally have a 10%, or approximately 10%, difference in slope.

Also disclosed herein is a holding clamp comprising a frame comprising a groove, the groove comprising sidewalls, a clamp plate, a wedge disposed in the groove, between the frame and the clamp plate, and a plurality of bolts that attach the frame and the clamp plate together. The sidewalls may, in at least one embodiment, diverge from adjacent sides of the wedge. Further, when a fiber comprising a main braid end and a tail end is wrapped around the wedge: the fiber may contact the sidewalls, the fiber may be disposed between a bottom portion of the wedge and the groove, and/or the fiber loops back on itself such that the main braid end and the tail end emerge from a same side of the holding clamp.

In at least an additional embodiment, the holding clamp comprises an O-ring applying pressure to the fiber when the fiber is wrapped around the wedge. The holding clamp may also comprise a bladder disposed on the frame such that the applied pressure results in a seal between the bladder and the frame. The holding clamp may further comprise a synthetic rubber portion disposed between the clamp plate and a top portion of the wedge such that a portion of the fiber contacts the synthetic rubber portion when the fiber is wrapped around the wedge.

A holding clamp in some embodiments comprises a frame comprising a groove, a clamp plate, a primary wedge comprising a cavity, and a secondary wedge comprising a protuberance that mates with the cavity. In at least one embodiment, the primary wedge is positioned between the frame and the clamp plate. The secondary wedge may also be positioned between the primary wedge and the clamp plate. Further, when a fiber comprising a main braid end and a tail end is wrapped around the primary wedge: a portion of the fiber is disposed between a bottom portion of the primary wedge and the groove, another portion of the fiber is disposed between the cavity and the protuberance, and/or the fiber loops back on itself such that the main braid end and the tail end emerge from a same side of the holding clamp.

In at least an additional embodiment, the groove comprises a curved section and straight, non-parallel sidewalls. The cavity may also comprise a curved section and straight, non-parallel sidewalls.

In at least a further embodiment, the holding clamp comprises a plurality of clamp bolts that extend through the clamp plate and into the frame.

Therefore, based on the foregoing and continuing description, the subject invention in its various embodiments may comprise one or more of the following features in any non-mutually-exclusive combination:

A holding clamp for fabric, the holding clamp comprising a first clamp piece, a second clamp piece having a groove with an open side facing the top clamp piece, a wedge positioned in the groove and between the first clamp piece and the second clamp piece, and a pressure source configured to press the first clamp piece and the second clamp piece towards each other;

The wedge being shaped such that, when a fabric is wrapped around the wedge and the pressure source is pressing the first clamp piece and the second clamp piece towards each other, the fabric is pinched between the wedge and the first clamp piece and/or the second clamp piece and is subject to at least 360° of capstan effect;

The groove comprising the open side, a bottom curved portion, and two straight sidewalls;

The two straight sidewalls not being parallel;

The two straight sidewalls having a 10%, or approximately 10%, difference in slope;

The wedge comprising a first side adjacent the first clamp piece and two other sides each adjacent to one of the two sidewalls of the groove;

The sidewalls being angled such that each pound of force exerted by the first clamp piece on the first side of the wedge generates ten pounds of force exerted by each of the two other sides of the wedge against the sidewalls;

The wedge being shaped such that, when a fabric is wrapped around the wedge and the pressure source is pressing the first clamp piece and the second clamp piece towards each other, the fabric is pinched between the wedge and the first clamp piece and/or the second clamp piece in at least two pinch effect areas;

The pressure source extending at least partially through the first clamp piece and the second clamp piece in at least two different points, one of the points being on one side of the groove and another of the points being on an opposite side of the groove, thereby resisting enlargement of an angle between sidewalls of the groove under pressure from the wedge;

The wedge comprising a second groove;

An open side of the second groove facing in the same direction as the open side of the groove of the second clamp piece;

The holding clamp further comprising a projection configured to sit in the second groove and configured such that, when the fabric is wrapped around the wedge and the pressure source is pressing the first clamp piece and the second clamp piece towards each other, the fabric is pinched between the projection and the second groove;

When the fabric is wrapped around the wedge and the pressure source is pressing the first clamp piece and the second clamp piece towards each other, the fabric is subject to at least 720° of capstan effect;

The projection being part of a secondary wedge and, when the pressure source is pressing the first clamp piece and the second clamp piece towards each other, the secondary wedge is clamped between the first clamp piece and the wedge;

The secondary groove comprising the open side of the second groove, a bottom curved second groove portion, and two straight second groove sidewalls;

The second groove sidewalls not being parallel;

The second groove sidewalls having a 10%, or approximately 10% difference in slope;

A holding clamp comprising a frame comprising a groove, the groove comprising sidewalls, a clamp plate, a wedge disposed in the groove, between the frame and the clamp plate, and a plurality of bolts that attach the frame and the clamp plate together;

The sidewalls diverging from adjacent sides of the wedge;

When a fiber comprising a main braid end and a tail end is wrapped around the wedge: the fiber contacts the sidewalls, the fiber is disposed between a bottom portion of the wedge and the groove, and/or the fiber loops back on itself such that the main braid end and the tail end emerge from a same side of the holding clamp;

The holding clamp further comprising an O-ring applying pressure to the fiber when the fiber is wrapped around the wedge;

The holding clamp further comprising a bladder disposed on the frame such that the applied pressure results in a seal between the bladder and the frame;

The holding clamp further comprising a synthetic rubber portion disposed between the clamp plate and a top portion of the wedge such that a portion of the fiber contacts the synthetic rubber portion when the fiber is wrapped around the wedge;

A holding clamp comprising a frame comprising a groove, a clamp plate, a primary wedge comprising a cavity, and a secondary wedge comprising a protuberance that mates with the cavity;

The primary wedge being positioned between the frame and the clamp plate;

The secondary wedge being positioned between the primary wedge and the clamp plate;

When a fiber comprising a main braid end and a tail end is wrapped around the primary wedge: a portion of the fiber is disposed between a bottom portion of the primary wedge and the groove, another portion of the fiber is disposed between the cavity and the protuberance, and/or the fiber loops back on itself such that the main braid end and the tail end emerge from a same side of the holding clamp;

The groove comprising a curved section and straight, non-parallel sidewalls;

The cavity comprising a curved section and straight, non-parallel sidewalls; and The holding clamp comprising a plurality of clamp bolts that extend through the clamp plate and into the frame.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

DETAILED DESCRIPTION

Figure 1:
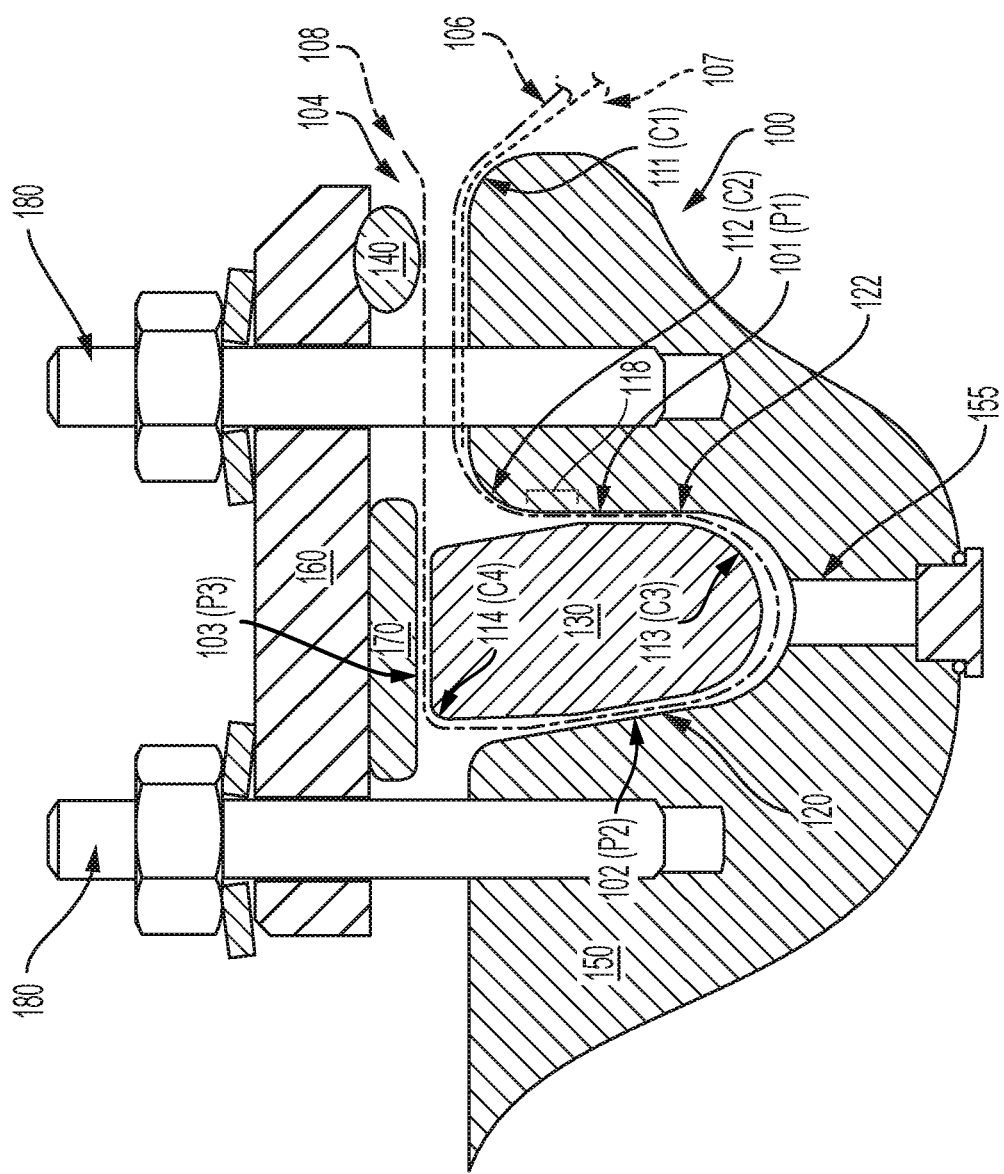
FIG. 1 is a section view diagram of a high holding power clamp, according to at least one embodiment of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention.

Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Generally, embodiments of the present invention are directed towards clamps for high tension load applications. In particular, the invention relates to high holding power clamps in which fabric can be secured, and which can withstand a large amount of force, including, in at least some embodiments, the maximum amount of tension achievable in various modern high strength fabrics and/or fiber weaves.

In at least one embodiment of the high holding power clamp, the clamp comprises at least four capstan effect areas and at least three pinch effect areas, arranged in a "single-V" design. The term "single-V" is used as a rough descriptive term for the shape of the path taken by the fiber/fabric around the bottom of the central island portion. Such a design loops one end of the fiber or fabric in the clamp around itself, thereby providing additional areas of restraint compared to currently-available fabric clamps.

In at least another embodiment of the high holding power clamp, the clamp comprises at least seven capstan effect areas and at least six pinch effect areas, arranged in a "double-V" design. The term "double-V" is used as a rough descriptive term for the shape of the path taken by the fiber/fabric around the central island portion—in a first V-shape around the bottom and then in a second V-shape around the projections on the top. Such a design comprises two V-shapes, providing more areas of potential restraint compared to even a clamp with a "single-V" design.

Specifically, and with particular reference to FIG. 1, a holding clamp 100 is shown that comprises three pinch effect areas and four capstan effect areas. The holding clamp 100 is generally ring-shaped, as can be more easily visualized in FIG. 4A and FIG. 5, and what is shown here is a partial cross-section. Hence the frame 150, clamp plate 160, wedge 130 and neoprene 170 are all ring-shaped in this embodiment. The pinching effect areas displayed are areas P1, P2, and P3 (with associated reference numbers 101, 102, and 103, respectively). The capstan effect areas displayed are areas C1, C2, C3, and C4 (with associated reference numbers 111, 112, 113, and 114, respectively). The holding clamp 100 comprises various blocks that hold an item to be clamped, such as, for instance, any type of natural or artificial fabric of fiber. A clamped fiber 104 is shown in the holding clamp 100, with a main braid end 106 and a tail end 108. As can be seen, the clamped fiber is inserted into the holding clamp such that it loops back on itself and, therefore, both the main braid end 106 and the tail end 108 emerge from the same side of the holding clamp.

In the transition zones, e.g., transition zone 118, the sidewalls 120, 122 diverge gradually from the adjacent sides of the wedge 130, avoiding sharp bends in the fabric strands that could lead to premature failure and allowing the clamp force to be applied to the braid 104 gradually. O-ring 140 is here used primarily not as a seal, but as means of gently applying pressure to the braid 104 and bladder 107, particularly when there is little or no pressure in the chamber. Without the O-ring (or some other equivalent) the braid 104 and bladder 107 may not be restrained well when there is no pressure in the vessel. The presence of the O-ring also helps achieve an initial seal. Without it there, obtaining an initial seal between the bladder 107 and the frame 150 under it may sometimes be difficult. Alternatively, other structures besides an O-ring may be used for the same purposes. The bladder 107 here provides a gas-tight inner skin to the fabric 104, which by itself is highly porous. The bladder 107 allows the fabric 104 to be used for a pressure vessel.

Figure 2:
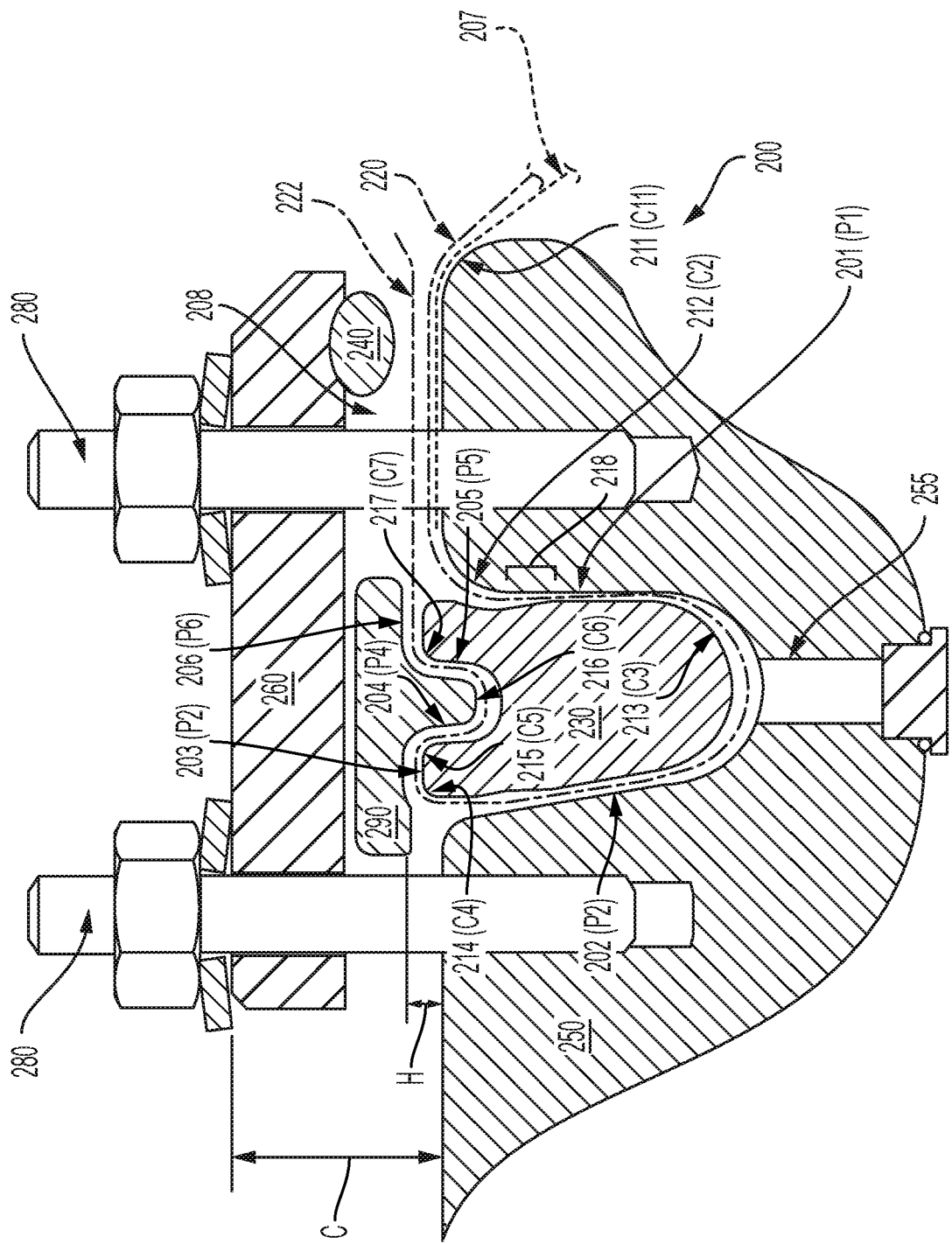
FIG. 2 is a section view diagram of another high holding power clamp, according to at least one embodiment of the present disclosure.

The fabric 104 loops around wedge 130 and is pinned between the wedge 130 and bottom frame 150 and neoprene piece 170. Neoprene 170 is in turn pinned between fabric 104/top of wedge 130 and clamp plate 160. The neoprene 170 increases friction between the clamp plate 160 and fabric 104 and smooths out any effects of non-parallelism between the two surfaces that contact the neoprene (clamp plate 160 and top of wedge 130). In FIG. 2, the secondary wedge provides similar benefits. For maximum holding force, the two sides of any clamp area should be kept as close to parallel as possible. Nevertheless, neoprene is an optional component of the single-V design.

Clamp bolts 180 attach the clamp plate 160 to the bottom frame 150 and clamp them together, extending from above the clamp plate 160, all the way through the clamp plate 160, and into the bottom frame 150. Clamp bolts 180 on the fabric side may extend through the fabric, with fabric threads parted to make room for them. The clamp bolts may be for example 8 mm or 10 mm diameter. The clamp bolts may be high strength steel, such as grade 8.8 carbon steel, which may be coated to avoid corrosion. The wedge 130, frame 150, and clamp plate 160 may be aluminum. The frame 150 and clamp plate 160 may be, for example, 6061T6 aluminum, while the wedge may be 7075T6 aircraft-grade high strength aluminum. When the wedge 130 is aluminum, the wedge forces are so high relative to tensile strength of the wedge 130 that the wedge 130 is forced to automatically self-center in the groove in the bottom frame 150 (defined by sidewalls 120, 122). This helps keep clamp forces uniform and improves holding power.

The clamping of the clamp plate 160 to the frame 150 creates a latching effect on the frame 150, preventing the angle between sidewalls 120, 122 of the main groove from opening significantly as the main wedge 130 is forced in. If the sidewalls 120, 122 are parallel, it may be difficult to remove wedge 130 and fabric 104 even after clamping force is removed. As shown, sidewalls 120, 122 have a slope difference between them of about 10% (0.1" of change in groove width for each 1.0 inch of wedge travel). With a fabric coefficient of friction of about 0.1, there is a ratio of about 10 between the force pushing the wedge 130 into the groove and the force the wedge 130 exerts on the groove sidewalls 120, 122. The slope force also exerts a natural ejection force tending to make the wedge 130 pop out of the groove when the clamp plate 160 is removed, although in practice some force, such as tapping with drift pins from underneath, may be required to knock the wedge loose. Drift pin holes 155 in frame 150 at the bottom of the main wedge groove are provided to support this function, and may be sealed with a small o-ring sealed plug during operation. When it comes time to disassemble the clamp, once the clamp plate 160 is removed, these plugs are removed and a small pin inserted to push the wedge out of its groove. Some means of pushing or pulling on the wedge 130 is normally required to get it out. Placing the drift pin hole 155 in the location shown keeps the low radius corners of the hole in an area of the groove that is not normally contacted by the braid 104.

The holding clamp 100 depicts a "single-V" design, in which the clamped fiber is looped around the wedge 130 of the clamp to provide more areas to apply capstan and/or pinching effects. In tests, the holding clamp was capable of developing up to 6,800 lbf per inch of clamp length at 70° F. However, the clamp sometimes failed before reaching 5,143 lbf per inch of clamp length, particularly at 100° F. Prior art holding clamps have a holding force of no more than 50% of this value. The tested fabric was constructed from fibers with a nominal fiber tensile strength of 410,000 pounds per square inch (psi) and an estimated friction coefficient of 0.1, which is similar to that of Teflon. Generally, the lower the friction coefficient, the more difficult it is to clamp a material and hold it in place.

The table below shows the various pinch effect areas of the holding clamp and the predicted holding power (in lbf) for each such pinch effect area.

TABLE 1

Predicted Holding Power for Each Pinch Effect Area in a Single-V Holding Clamp

| Pinch Effect Area | Estimated Contact Pressure (in psi) | Contact Length (in inches) | Total Force (in lbf) | Number of Sides | Predicted Holding Power (in lbf) |
|---|---|---|---|---|---|
| P1 (101) | 18,000 | 0.473 | 8,514 | 2 | 1,703 |
| P2 (102) | 18,000 | 0.541 | 9,738 | 2 | 1,948 |
| P3 (103) |  |  | 3,000 | 2 | 600 |

The Number of Sides refers to the number of sides of fabric that are exposed to the stated contact pressure. Over a capstan, only one side has a contact force applied. In a wedge, both sides (two sides) are exposed to the contact force. The Estimated Contact Pressure is the product of the force pushing the wedge into the groove and the inverse of the slope. An 1800 lb force pushing a wedge into a groove with a total sidewall slope difference of 10%, or approximately 10%, produces a nominally 18,000 lbf between the wedge and the sidewalls of the groove. The Total Force is the product of the contact pressure and the contact length and depth (a depth of one inch is assumed to normalize the total force to "per circumferential inch of clamp"). Depth in this case refers to circumferential length. The Predicted Holding Power is similarly normalized to "per circumferential inch of clamp" since it is based on the normalized Total Force, and is equal to the Total Force times coefficient of friction (here, coefficient of friction taken as 0.1) times number of sides of the fabric over which the friction is assumed to act.

As can be seen from Table 1, the total amount of predicted holding power provided by the three pinch effect areas P1-P3 in holding clamp 100 is 4,251 lbf.

Table 2 below shows the various capstan effect areas of the holding clamp 100 and the amount of capstan effect (measured in degrees) for each such capstan effect area.

TABLE 2

Degree of Capstan Effect for Each Capstan Effect Area in a Single-V Holding Clamp

| Capstan Effect Area | Degrees of Capstan Effect |
|---|---|
| C1 (111) | 45 |
| C2 (112) | 90 |
| C3 (113) | 175 |
| C4 (114) | 90 |

As can be seen from Table 2, the total capstan effect provided by the four capstan effect areas C1-C4 in holding clamp 100 is 400 degrees. To hold a line with the capstan on a winch with only modest force on the free end/tail, generally at least two turns of the line around the capstan are needed. For a coefficient of friction of 0.1, the capstan formula from page 2 yields a multiplier of 3.52 for a capstan angle of 4pi (two complete turns or 720°), meaning that the capstan will hold 3.52 lbs of line load for each lbf of tension on the free tail end. At 400 degrees, the multiplier is about 2.

To estimate the total hold force of a clamp, the predicted holding power of each pinch point can be multiplied by the multiplier given by the capstan formula for a capstan angle equal to the total capstan angle occurring before that pinch point. Then these values can be summed for the estimated total hold force. Thus for the above example, pinch point P3 is after the full 400 degree capstan angle, so the 600 lbf holding power is multiplied by 2, giving about 1,200 lbf. Pinch point P2 is placed after all capstan areas except for C4, totaling a capstan angle of 310 degrees for a multiplier of 1.72 and a total value of about 3,350 lbf. Pinch point P1 is placed after a total capstan angle of 135 degrees, for a multiplier of about 1.27, giving a total value of about 2,150 lbf. Summing 1,200, 3,350 and 2,150 gives a total estimated holding force of 6,700 lbf, which is very close to the maximum value observed in testing for this clamp.

Using the above estimation method, and by varying the pinch points and capstan angles (for example by altering the shape of the wedge, groove, and/or other pieces), a clamp may be designed for any desired hold force. For capstan angles much greater than 360 degrees, additional wedge pieces may be useful, for example as described below.

Turning now to FIG. 2, a holding clamp 200 is shown that comprises six pinch effect areas and seven capstan effect areas. The pinching effect areas displayed are areas P1, P2, P3, P4, P5, and P6 (with associated reference numbers 201, 202, 203, 204, 205, and 206 respectively). The capstan effect areas displayed are areas C1, C2, C3, C4, C5, C6, and C7 (with associated reference numbers 211, 212, 213, 214, 215, 216, and 217, respectively). The holding clamp 200 comprises various blocks that hold an item to be clamped, such as, for instance, any type of natural or artificial fabric of fiber. A clamped fiber 208 is shown in the holding clamp 200, with a main braid end 220 and a tail end 222. As can be seen, the clamped fiber is inserted into the holding clamp such that it loops back on itself and, therefore, both the main braid end 220 and the tail end 222 emerge from the same side of the holding clamp. Dimension H is a measure of how far the main wedge has been pushed into the groove, and this dimension can be measured even after the entire assembly is assembled, by accessing the assembly from the open left side. The extension of the secondary wedge to the left, past the main wedge and sidewall, as shown, eases this measurement. However, alternatively dimension C can be measured and corrected for any tilt and/or bending in the clamp plate. Particularly where such an alternative measurement works well, the extension of the secondary wedge is unnecessary and a differently shaped secondary wedge may be used.

As in the embodiment of FIG. 1, there is a transition zone 218, clamp plate 260, clamp bolts 280, frame 250, wedge 230, and O-ring 240. No neoprene is used, although it could be. Here, wedge 230 has a groove on its upper surface similar in shape to the groove in the frame 250 below the wedge 230. This groove has a bottom curved section and straight, non-parallel sidewalls just like the groove in frame 250. Secondary wedge 290 having a projection that mates with the wedge groove is used to secure the fabric 208 within the wedge groove, pinching the fabric and producing an additional capstan effect when the secondary wedge 290 is forced against the wedge 230 by the clamp bolts 280, clamp plate 260 and frame 250.

The holding clamp 200 depicts a "double-V" design, in which the clamped fiber makes several turns as it goes through the interior wedge portions of the clamp, providing more areas to apply capstan and/or pinching effects. In tests, the holding clamp had a capacity above 5,143 lbf per inch of clamp length. Indeed, in these tests, failure only occurred because of fabric failure, i.e., failure did not occur due to slippage of the fabric from the clamp, only due to tearing of the tested fabric. Tested fabric had a nominal fiber tensile strength of 410,000 pounds per square inch (psi) and an estimated friction coefficient of 0.1.

Table 3 below shows the various pinch effect areas of the holding clamp and the predicted holding power (in lbf) for each such pinch effect area.

TABLE 3

Predicted Holding Power for Each Pinch Effect Area in a Double-V Holding Clamp

| Pinch Effect Area | Estimated Contact Pressure (in psi) | Contact Length (in inches) | Total Force (in lbf) | Number of Sides | Predicted Holding Power (in lbf) |
|---|---|---|---|---|---|
| P1 (201) | 18,000 | 0.473 | 8,514 | 2 | 1,703 |
| P2 (202) | 18,000 | 0.541 | 9,738 | 2 | 1,948 |
| P3 (203) | 15,000 | 0.089 | 1,335 | 2 | 266 |
| P4 (204) | 15,000 | 0.11 | 1,650 | 2 | 330 |
| P5 (205) | 15,000 | 0.13 | 1,950 | 2 | 195 |
| P6 (206) | 15,000 | 0.13 | 1,950 | 2 | 195 |

As can be seen from Table 3, the total amount of predicted holding power provided by the pinch effect areas P1-P6 in holding clamp 200 is 4,637 lbf.

Table 4 below shows the various capstan effect areas of the holding clamp 200 and the amount of capstan effect (measured in degrees) for each such capstan effect area.

TABLE 4

Degree of Capstan Effect for Each Capstan Effect Area in a Double-V Holding Clamp

| Capstan Effect Area | Degrees of Capstan Effect |
|---|---|
| C1 (211) | 45 |
| C2 (212) | 90 |
| C3 (213) | 175 |
| C4 (214) | 90 |
| C5 (215) | 85 |
| C6 (216) | 170 |
| C7 (217) | 85 |

As can be seen from Table 4, the total capstan effect provided by the four capstan effect areas C1-C7 in holding clamp 200 is 740 degrees. A skilled artisan will recognize that 720 degrees of capstan effect is generally sufficient to hold a line around a capstan up to the line's breaking strength, assuming there is some tension on the free tail end.

Accordingly, the holding clamp 200 has sufficient holding capacity such that its capacity is limited only by the strength of the fabric. In other words, the clamp will generally not fail (i.e., the clamp will not allow slippage of the clamped fabric) before the clamped fabric itself fails.

Figure 3:
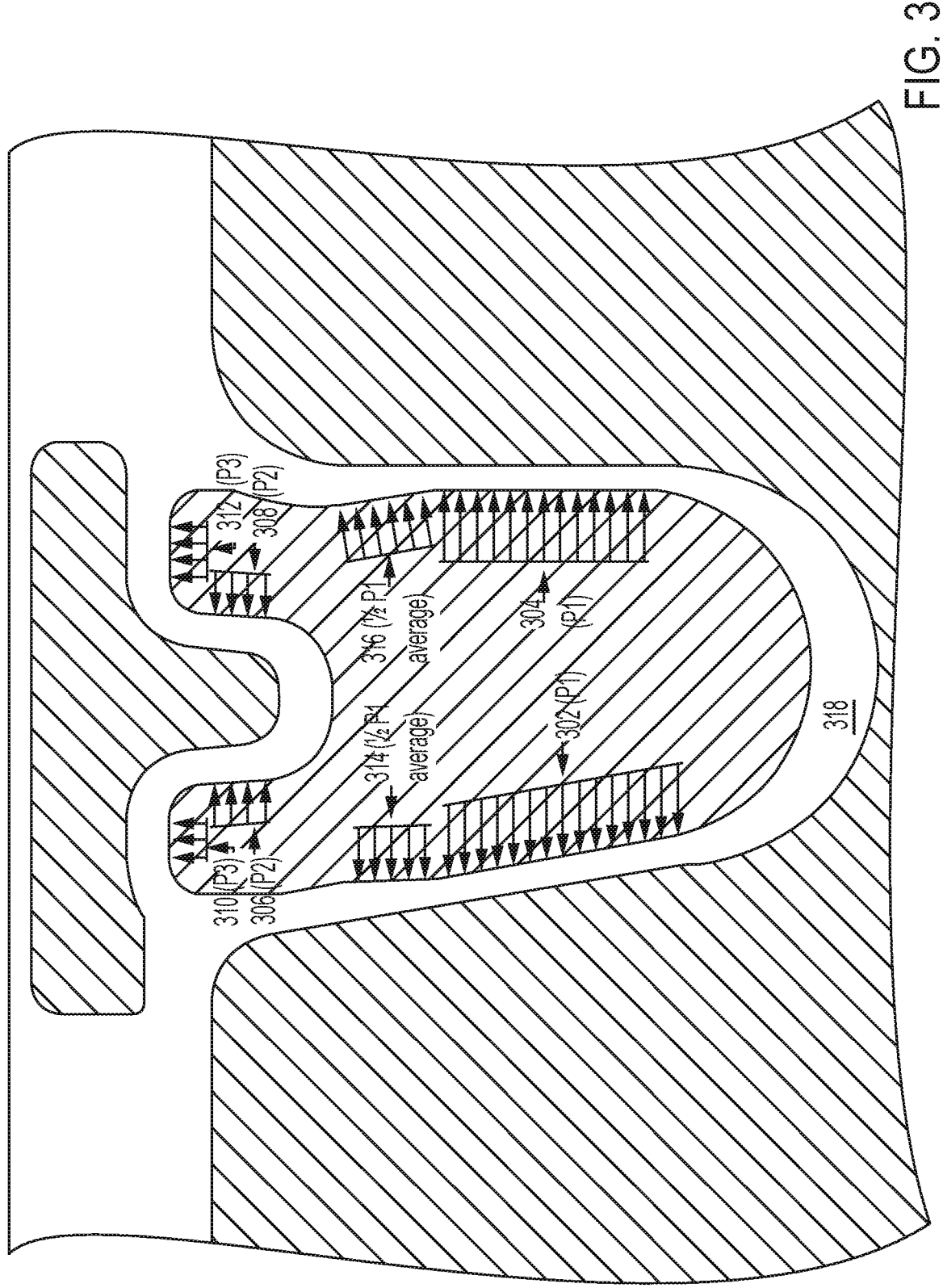
FIG. 3 is a section view diagram of pinch effect contact areas in a high holding power clamp, according to at least one embodiment of the present disclosure.

Turning now to FIG. 3, a diagram of pinch effect contact areas in a high holding power clamp is shown. Specifically shown are areas 302 (P1), 304 (P1), 306 (P2), 308 (P2), 310 (P3), and 312 (P3). For each pinch zone, the estimated contact pressure is applied over a specific length, i.e., 0.458 inches for area 302 (P1), 0.375 inches for area 304 (P1), 0.13 inches for area 306 (P2), 0.13 inches for area 308 (P2), 0.089 inches for area 310 (P3), and 0.11 inches for area 312 (P3). The areas 314 and 316 with the ½ P1 indication represent transitions zones of 0.167 inches for area 314 and 0.196 inches for area 316, where the fabric is fully compressed at one end and not compressed at all at the other end. The average contact pressure applicable over the transition zone is then estimated to be ½ the contract pressure applicable in the main portion of the pinch zone where both sides of the gap are parallel and the "pinching" is uniform. Additionally, the width of the gap 318, or of a portion thereof, is 0.082 inches, which represents a distance between the wedge (e.g., wedge 230) and the frame (e.g., frame 250).

Figure 4C:
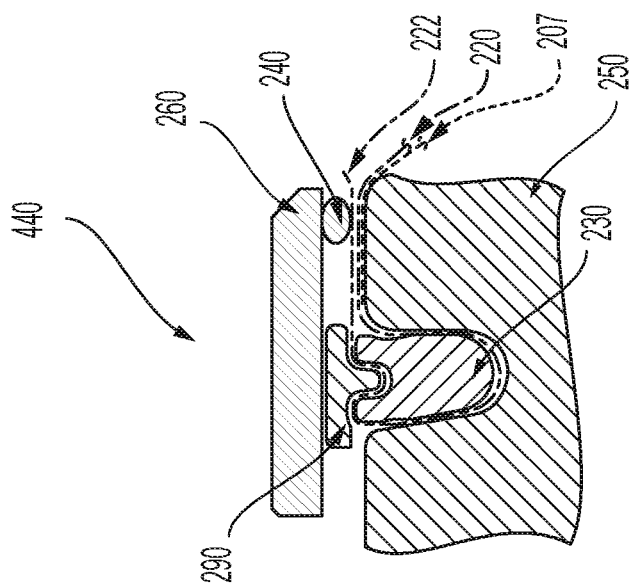
FIGS. 4A-4C are a side view of a high holding power clamp, a section view of a high holding power clamp, and a detail section view of a high holding power clamp, respectively, according to at least one embodiment of the present disclosure.
Figure 4B:
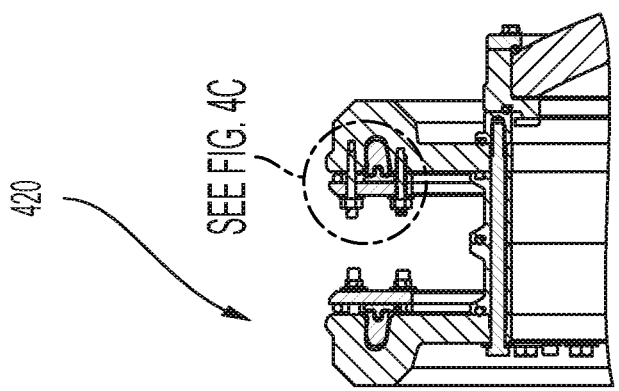
Figure 4A:
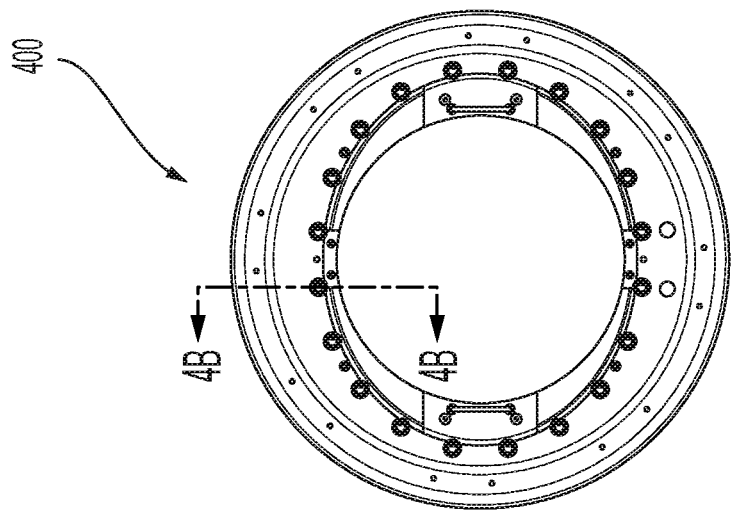

FIGS. 4A-4C are a side view of a high holding power clamp 400 (FIG. 4A), a section view of a high holding power clamp 420 (FIG. 4B), and a detail section view of a high holding power clamp 440 (FIG. 4C), respectively, according to at least one embodiment of the present disclosure as shown in FIG. 2.

Figure 5:
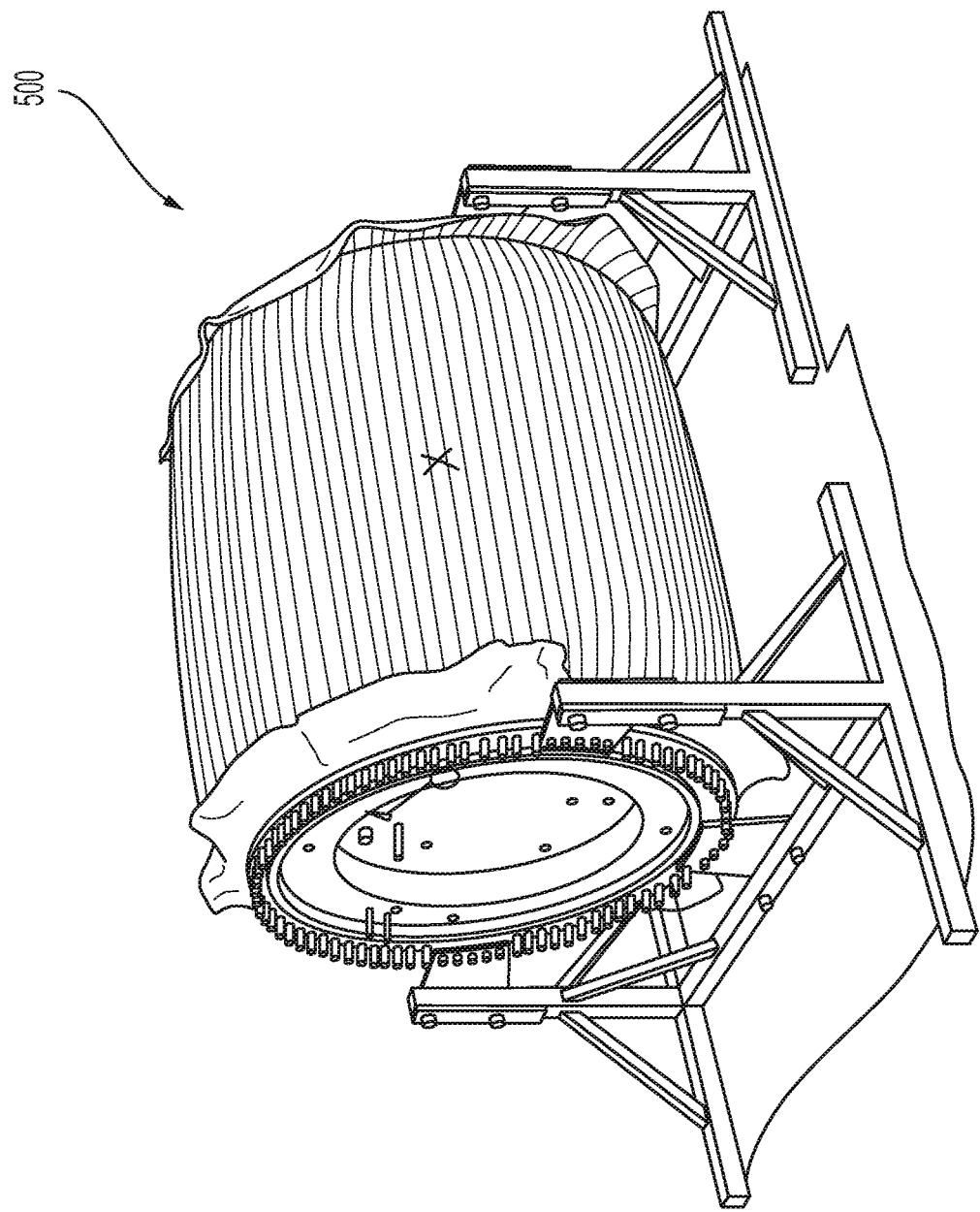
FIG. 5 is a perspective photograph of a high holding power clamp, according to at least one embodiment of the present disclosure.

FIG. 5 is a perspective photograph of a high holding power clamp 500, according to at least one embodiment of the present disclosure.

It should be appreciated that the various holding clamps described above herein achieve holding capacity by utilizing a combination of areas that have a pinching effect on the clamped fabric and areas that have a capstan effect on the fabric. Such a combination is an improvement upon currently-available holding clamps, which primarily only use areas that have a pinching effect on the clamped item.

One or more of the holding clamps described herein have additional benefits of being more tolerant of time-related reduction in fabric thickness in the pinch zones. The holding power of the capstan effect areas is not affected by fabric thickness and the cumulative holding power of these areas is sufficient to achieve breaking load of the fabric.

Additionally, one or more of the holding clamps described above herein allow the user to reliably develop the full tensile strength of the fabric. That is, a user should be unable to pull fabric through the clamp under any circumstance; the fabric will tear or otherwise fail before a user is able to pull the fabric through.

It should further be appreciated that the holding clamps described above herein have dimensions that can be varied in order to accommodate a range of fabric thicknesses. Within a small range of thicknesses, different fabric thickness can be accommodated by varying the distance to which the main wedge is pushed into its groove. Larger variations can be accommodated by varying the width of the gap, G, that is assumed to be filled by the fabric. Holding clamps utilizing the capstan effect are therefore suitable for clamping any type of fabric, including, but not limited to, braided fabric, and with any thickness and/or tensile strength. However, to assemble the clamp in the configuration shown, it must be possible to separate the fabric threads enough to make an opening large enough for the clamp bolts to go through. Generally any fabrics made from a coarse, slippery thread, such as Vectran (used for testing) is usable. For fabric with a really tight weave, such as cotton fabric used for clothing, a different configuration is required. In such cases, the disclosed clamps may be adapted by, for example, placing a pivot point under the end of the clamp plate where there is no fabric. That would eliminate the latch effect of the clamp plate which prevents the angle between the walls of the main groove from opening as the main wedge is forced in, reducing the contact pressures planned for pinch zones P1 and P2.

To assemble a hold clamp according to embodiments of the present invention, generally the bladder and braid may first be attached to the frame, then the wedge inserted manually, then the fabric looped over the wedge, then the clamp plate attached to the frame and tightened down to force the wedge to a desired depth. If there is a secondary wedge, the clamp plate may be only partially tightened to partially insert the main wedge, and then the clamp plate may be removed, the secondary wedge inserted, and then the clamp plate put back into place and tightened until the wedges are inserted to the desired depth.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

I claim:

1. A holding clamp for fabric, the clamp comprising:
a first clamp piece;
a second clamp piece having a groove with an open side facing the top clamp piece;
a wedge positioned in the groove and between the first clamp piece and the second clamp piece; and
a pressure source configured to press the first clamp piece and the second clamp piece towards each other;
wherein the wedge is shaped such that, when a fabric is wrapped around the wedge and the pressure source is pressing the first clamp piece and the second clamp piece towards each other, the fabric is pinched between the wedge and the first clamp piece and/or the second clamp piece and is subject to at least 360 degree of capstan effect;
wherein the wedge comprises a second groove; and
wherein an open side of the second groove faces the same direction as the open side of the groove of the second clamp piece.

2. The holding clamp according to claim 1, wherein the groove comprises the open side, a bottom curved portion, and two straight sidewalls, wherein the sidewalls are not parallel.

3. The holding clamp according to claim 2, wherein there is a 10% slope difference between the two straight sidewalls.

4. The holding clamp according to claim 3, wherein the wedge comprises a first side adjacent the first clamp piece and two other sides each adjacent to one of the two sidewalls of the groove, wherein the sidewalls are angled such that each pound of force exerted by the first clamp piece on the first side of the wedge generates ten pounds of force exerted by each of the two other sides of the wedge against the sidewalls.

5. The holding clamp according to claim 1, wherein the wedge is shaped such that, when a fabric is wrapped around the wedge and the pressure source is pressing the first clamp piece and the second clamp piece towards each other, the fabric is pinched between the wedge and the first clamp piece and/or the second clamp piece in at least two pinch effect areas.

6. The holding clamp according to claim 1, wherein the pressure source extends at least partially through the first clamp piece and the second clamp piece in at least two different points, one of the points being on one side of the groove and another of the points being on an opposite side of the groove, thereby resisting enlargement of an angle between sidewalls of the groove under pressure from the wedge.

7. The holding clamp according to claim 1, further comprising a projection configured to sit in the second groove and configured such that, when the fabric is wrapped around the wedge and the pressure source is pressing the first clamp piece and the second clamp piece towards each other, the fabric is pinched between the projection and the second groove.

8. The holding clamp according to claim 7, wherein when the fabric is wrapped around the wedge and the pressure source is pressing the first clamp piece and the second clamp piece towards each other, the fabric is subject to at least 720° of capstan effect.

9. The holding clamp according to claim 7, wherein the projection is part of a secondary wedge and, when the pressure source is pressing the first clamp piece and the second clamp piece towards each other, the secondary wedge is clamped between the first clamp piece and the wedge.

10. The holding clamp according to claim 7, wherein the secondary groove comprises the open side of the second groove, a bottom curved second groove portion, and two straight second groove sidewalls, wherein the second groove sidewalls are not parallel and have a 10%, or approximately 10%, difference in slope.

11. A holding clamp comprising:
a frame comprising a groove;
a clamp plate;
a primary wedge comprising a cavity; and
a secondary wedge comprising a protuberance that mates with the cavity;
wherein the primary wedge is positioned between the frame and the clamp plate,
wherein the secondary wedge is positioned between the primary wedge and the clamp plate, and
wherein, when a fiber comprising a main braid end and a tail end is wrapped around the primary wedge:
a portion of the fiber is disposed between a bottom portion of the primary wedge and the groove,
another portion of the fiber is disposed between the cavity and the protuberance, and
the fiber loops back on itself such that the main braid end and the tail end emerge from a same side of the holding clamp.

12. The holding clamp according to claim 11, wherein the groove comprises a curved section and straight, non-parallel sidewalls.

13. The holding clamp according to claim 12, wherein the cavity comprises a curved section and straight, non-parallel sidewalls.

14. The holding clamp according to claim 11, further comprising a plurality of clamp bolts that extend through the clamp plate and into the frame.

* * * * *